UNITED STATES PATENT OFFICE.

PHILIPP KROPP, OF LEIPSIC, SAXONY, GERMANY, ASSIGNOR TO HIMSELF, JACOB NACHOD, AND FREDERICK NACHOD, OF SAME PLACE, AND FREDERICK KÜHNE AND PERCIVAL KNAUTH, OF NEW YORK.

COMPOSITION FOR TREATING RUBBER CLOTH, &c.

SPECIFICATION forming part of Letters Patent No. 236,709, dated January 18, 1881.

Application filed October 27, 1880. (Specimens.)

*To all whom it may concern:*

Be it known that I, PHILIPP KROPP, of Leipsic, Saxony, in the Empire of Germany, have invented an Improved Process and Composition for Treating Rubber Cloth, &c., of which the following is a specification.

The object of this invention is to prepare rubber cloth for printing designs thereupon, so that the rubber itself will be safe against the influence of fatty and oily substances, and so that rubber cloth may be properly and safely used as a table-cover, for tailors' and shoemakers' measures, and wherever heretofore its use has been deemed impracticable owing to the fact that the rubber will readily be spoiled by contact with fatty matters.

My invention consists, principally, in covering the rubber surface of the cloth before printing it with a certain composition which gives it any suitable color and serves to protect the rubber in manner stated. After that any suitable design may be printed upon the rubber cloth so treated.

In making the rubber cloth I proceed as follows: A suitable mixture of india-rubber and white zinc is properly agitated until it forms a plastic mass, which is then rolled into sheets between suitable rollers. The sheets are then placed into suitable vessels, where naphtha is poured over them. Naphtha to a certain extent dissolves these rubber sheets or plates, imparting to them a doughy consistency. The soft sheets thus produced are then again placed between rollers and rolled out until they are in a condition, as far as thickness and softness are concerned, that they may be spread upon the cotton or other fabric that usually constitutes the body of rubber-covered cloth, and upon this fabric the mixture is applied in usual manner. The rubber-covered cloth produced is now placed into a dry-room until all traces of the naphtha have been evaporated. After this the rubber is vulcanized on the cloth in the usual manner.

As far as I have described the making of the rubber cloth—that is to say, the preparation of the rubber and its application to the cloth itself—I have followed the process heretofore in use; but the invention which I here seek to communicate is as follows:

I boil pure linseed-oil about three days until it forms a tough paste, then add a very small proportion of gum-copal. This proportion varies according to the temperature, more being needed in summer than in winter. Before adding the copal I mix with the linseed-oil a small proportion of oxide of manganese, which is to serve as a drier. I further add to this mixture as much coloring-matter, by weight, as the mixture itself weighs, and prefer for this purpose lithopone, which is white sulphide of zinc—an artificial color, which is to take the place of white lead, for white lead would be injurious to health on table-covers. The mixture of the linseed-oil, oxide of manganese, copal, and lithopone or other coloring-matter is now agitated until it forms a salve-like white mass, which I then spread over the rubber surface of the rubber-covered cloth by the usual spreading-machine, repeating the application as often as necessary to obtain the requisite thickness and finish of cover on top of the rubber. In a suitable drying-room having very moderate heat, preferably less than 180° Fahrenheit, the cloth thus prepared is now slowly dried. After this suitable designs are printed upon the surface so prepared in colors, which I grind in oil and mix with turpentine.

The covers will be useful as table-covers, bed-covers, aprons, curtains, or the like.

When the material is to be used in the manufacture of measures for tailors, shoe-makers, &c., both sides of the fabric are covered with rubber, and both sides of the rubber then treated with the coloring-mixture, as already described.

I claim—

1. The composition of linseed-oil, oxide of manganese, copal, and coloring-matter for use as a protecting-cover on rubber cloth, substantially as described.

2. The process herein described of preparing rubber-covered cloth, which process consists in first applying the rubber to the cloth, then applying over the rubber when dry a coloring-matter mixed with linseed-oil, oxide of manganese, and copal, then drying the last-mentioned coat, and finally applying the design upon the latter, substantially as specified.

PHILIPP KROPP.

Witnesses:
GUSTAV WOHLAUER,
HUGO TELLER.